US009352418B2

United States Patent
Roy et al.

(10) Patent No.: US 9,352,418 B2
(45) Date of Patent: May 31, 2016

(54) LASER-ABLATION-BASED MATERIAL ANALYSIS SYSTEM WITH A POWER/ENERGY DETECTOR

(71) Applicant: Teledyne Instruments, Inc., Thousand Oaks, CA (US)

(72) Inventors: John W. Roy, Rancho Sante Fe, CA (US); James Bryan Barbula, Livingston, MT (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 14/588,824

(22) Filed: Jan. 2, 2015

(65) Prior Publication Data

US 2015/0190884 A1 Jul. 9, 2015

Related U.S. Application Data

(60) Provisional application No. 61/924,182, filed on Jan. 6, 2014.

(51) Int. Cl.
| | |
|---|---|
| H01J 49/26 | (2006.01) |
| B23K 26/16 | (2006.01) |
| B23K 26/12 | (2014.01) |
| B23K 26/36 | (2014.01) |
| B23K 26/30 | (2014.01) |
| G01J 3/443 | (2006.01) |
| H01J 49/10 | (2006.01) |
| H01J 49/04 | (2006.01) |

(52) U.S. Cl.
CPC ............ *B23K 26/16* (2013.01); *B23K 26/127* (2013.01); *B23K 26/36* (2013.01); *B23K 26/426* (2013.01); *G01J 3/443* (2013.01); *H01J 49/0463* (2013.01); *H01J 49/105* (2013.01); *H01J 49/26* (2013.01)

(58) Field of Classification Search
USPC .................. 250/281, 282, 283, 288
See application file for complete search history.

(56) References Cited

U.S. PATENT DOCUMENTS

| | | | |
|---|---|---|---|
| 5,210,412 A | 5/1993 | Levis et al. | |
| 6,359,687 B1 | 3/2002 | Cheng | |
| 2005/0061779 A1* | 3/2005 | Blumenfeld | B23K 26/03 219/121.6 |

(Continued)

FOREIGN PATENT DOCUMENTS

| | | |
|---|---|---|
| JP | 2004-212215 A | 7/2004 |
| WO | WO 98/03684 A1 | 1/1998 |

OTHER PUBLICATIONS

Goddard, B.J., "Materials analysis using laser-based spectroscopic techniques", Transactions of the Institute of Measurement and Control, vol. 13, No. 3, 1991, pp. 128-139.

(Continued)

*Primary Examiner* — Nicole Ippolito
(74) *Attorney, Agent, or Firm* — K&L Gates LLP (57) ABSTRACT

A laser ablation system and methods are disclosed for performing material analysis. The laser ablation system includes a sample chamber which holds and encloses a sample material to be ablated; a laser source that produces a laser beam which is directed into the sample chamber to a surface of the sample material to cause laser ablation; a laser measuring device which is physically attached to the sample chamber to measure a power/energy value of the laser beam; and a material analyzing module that is coupled to the sample chamber to receive the ablated material from laser ablation of the sample material.

24 Claims, 8 Drawing Sheets

(56) References Cited

U.S. PATENT DOCUMENTS

| | | | |
|---|---|---|---|
| 2011/0240839 A1 | 10/2011 | Hutchinson et al. | |
| 2012/0206722 A1* | 8/2012 | Grigoropoulos | G01N 21/718 356/318 |
| 2014/0287953 A1* | 9/2014 | Gunther et al. | 506/9 |
| 2014/0291305 A1* | 10/2014 | Straw | 219/121.69 |

OTHER PUBLICATIONS

Robson et al., "Ionisation and fragmentation dynamics of laser desorbed polycyclic aromatic hydrocarbons using femtosecond and nanosecond post-ionisation", International Journal of Mass Spectrometry, 220, 2002, pp. 69-85.

Ertel et al., "Siderophile elements in silicate melts—A review of the mechanically assisted equilibrium technique and the nanonugget issue", ScienceDirect, Elsevier, Chemical Geology, 248, 2008, pp. 119-139.

International Search Report and Written Opinion of the International Searching Authority for International Application No. PCT/US2005/010062 mailed Mar. 27, 2015.

* cited by examiner

LASER-ABLATION-BASED MATERIAL ANALYSIS SYSTEM WITH A POWER/ENERGY DETECTOR

CROSS-REFERENCE TO RELATED APPLICATION

This application claims the benefit of U.S. Provisional Patent Application Ser. No. 61/924,182 entitled "LASER-ABLATION-BASED MATERIAL ANALYSIS SYSTEM WITH AN INTERNAL POWER/ENERGY DETECTOR," filed on Jan. 6, 2014, which is entirely incorporated herein by reference.

TECHNICAL FIELD

The subject matter described in this disclosure generally relates to systems, devices, and techniques for using laser ablation for material analysis. More specifically, the subject matter relates to using laser systems together with material analysis instruments, such as inductively coupled mass spectrometers (ICP-MS) and inductively coupled optical emission spectrometers (ICP-OES), to determine the elemental composition, elemental concentrations and isotope ratios of the material.

BACKGROUND

Laser ablation is a process that directs high-energy laser pulses to impinge on the surface of a material causing ablation of the surface via laser-material interactions. Laser ablation generates particles or clusters of the material that can be transported by a carrier gas away from the ablation point. The particles or clusters of the material generated by laser ablation can be collected and analyzed to determine properties of the material, e.g., the material composition such as elemental concentrations and isotope ratios. For example, laser ablation can be used for inductively-coupled plasma mass spectrometry (LA-ICP-MS) which provides a sampling technique to assess elemental concentrations and isotope ratios in solids with little or no sample preparation. ICP-MS uses an inductively-coupled plasma to produce ions which are subsequently analyzed with a mass spectrometer.

SUMMARY

Techniques, systems, and devices are disclosed for performing material analysis using a laser ablation system with an in-situ laser power/energy detector.

In one aspect, a laser ablation system for performing material analysis includes: a sample chamber which holds and encloses a sample material to be ablated; a laser source that produces a laser beam which is directed into the sample chamber to a surface of the sample material to cause laser ablation; a laser measuring device which is physically coupled to the sample chamber to measure a power/energy value of the laser beam; and a material analyzing module that is coupled to the sample chamber to receive the ablated material from laser ablation of the sample material.

In some implementations, the laser measuring device is a laser energy detector or energy meter.

In some implementations, the laser measuring device is a laser power detector or power meter.

In some implementations, the laser measuring device is a photodiode detector.

In some implementations, the laser measuring device is a metal-semiconductor-metal (MSM) photodetector.

In some implementations, the laser measuring device is a thermal detector.

In some implementations, the laser measuring device is a pyroelectric detector.

In some implementations, the laser measuring device is a photomultiplier tube.

In some implementations, the laser measuring device is located inside the sample chamber and the laser beam entering the sample chamber is directed onto a receiver of the laser measuring device by mirrors or other means.

In some implementations, the laser measuring device is located inside the sample chamber at the focal plane of the laser beam providing that the power density of the laser beam is reduced to a level that does not damage the device.

In some implementations, the laser measuring device is located inside the sample chamber at the focal plane of the laser beam when a protective filter or other material is added to the device to prevent damage to the device.

In some implementations, the laser measuring device is located inside the sample chamber above or below the focal plane of the laser beam where the power density of the laser beam is reduced to a level that does not damage the device.

In some implementations, the laser measuring device is mounted to an outside wall of the sample chamber and the laser beam entering the sample chamber is directed onto a receiver of the laser measuring device through an opening in a wall of the sample chamber.

In some implementations, the laser measuring device is mounted onto or placed inside a removable drawer which is inserted into the sample chamber.

In some implementations, the removable drawer includes an area separated from the laser measuring device for holding the sample material.

In some implementations, the laser power/energy is measured simultaneously when the laser ablation of the sample material is taking place.

In some implementations, the laser power/energy is measured before the laser ablation of the sample material takes place.

In some implementations, the laser beam is split into two beams by adding a partially reflective mirror then directing one beam to the sample and the other to the laser measuring device such that the laser power/energy can be measured simultaneously when ablating the sample.

In some implementations, the laser power/energy is measured after the laser ablation of the sample material has taken place.

In some implementations, the laser measuring device is configured to provide feedback to the laser ablation system to allow for automatic adjustment of the laser beam power/energy.

In some implementations, the laser source includes a pulsed laser source.

In some implementations, the laser source includes a continuous wave (CW) laser source.

In some implementations, the material analyzing module includes an inductively coupled mass spectrometer (ICP-MS) or an inductively coupled optical emission spectrometer (ICP-OES) instrument.

In another aspect, a technique for performing material analysis using a laser ablation system is described. This technique includes: directing a laser beam onto a surface of a sample material placed inside a sample chamber to cause laser ablation of the sample material; during the laser ablation, simultaneously measuring a laser power/energy of the laser beam using a laser measuring device which is physically attached to the sample chamber; and using a material analyzing module coupled to the sample chamber to receive the ablated material from laser ablation of the sample material for material analysis.

In yet another aspect, a technique for performing material analysis using a laser ablation system is described. This technique includes: directing a laser beam onto a surface of a sample material placed inside a sample chamber to cause laser ablation of the sample material; using a material analyzing module coupled to the sample chamber to receive the ablated material from laser ablation of the sample material for material analysis; and after the laser ablation, directing the laser beam onto a laser measuring device physically attached to the sample chamber to measure a laser power/energy of the laser beam.

In yet another aspect, a technique for performing material analysis using a laser ablation system is described. This technique includes: directing a laser beam onto a laser measuring device which is physically attached to a sample chamber to measure a laser power/energy of the laser beam; after the laser power/energy measurement, directing the laser beam onto a surface of a sample material placed inside the sample chamber to cause laser ablation of the sample material; using a material analyzing module coupled to the sample chamber to receive the ablated material from laser ablation of the sample material for material analysis.

DETAILED DESCRIPTION

Laser ablation combined with inductively-coupled plasma mass spectrometry (LA-ICP-MS) or inductively coupled optical emission spectrometers (ICP-OES) provides an efficient material analysis tool. Such a system typically requires the use of a sample chamber that contains one or more samples to be analyzed. The sample chamber permits the passage of laser beam through a window, a lens or other means to ablate (i.e., "vaporize") the sample placed inside the chamber, resulting in particles or clusters of the material that are subsequently transported by means of a "carrier" gas that flows through the sample chamber to the ICP-MS or ICP-OES material analyzing instrument. It is desirable to measure the amount of laser energy or laser power that the sample is exposed to. The knowledge of these values can be highly important to the reproducibility of laser ablation processes. Moreover, these values provide a means to monitor degradation or loss of energy that may occur in the laser beam path leading up to the sample chamber and losses through the sample chamber window. Some systems monitors the laser beam energy by position an energy detector somewhere between the laser and the sample chamber.

Disclosed are techniques, systems, and devices for using laser ablation to perform material analysis. In one aspect, a disclosed technique for material analysis includes using a laser system to ablate samples (which can include solid, liquid, or gas) that are contained inside a sample chamber to generate aerosol of particles, and then analyzing the aerosol of particles by an ICP-MS or ICP-OES instrument. The sample chamber includes an internal energy meter or an internal power meter that is operable to measure the amount of laser energy or power that enters the chamber which is subsequently transferred into the sample.

In another aspect, a disclosed system for material analysis includes a sample chamber that holds one or more samples; a laser that emits pulsed beam or continuous output power; optics to shape and/or direct the laser beam to the sample chamber and onto the one or more samples to produce a laser induced aerosol of particles; an ICP-MS or ICP-OES instrument to receive the aerosol of particles; tubing that connects the sample chamber with the instrument and transports the particles by means of gas flowing through the tubing to the ICP-MS or ICP-OES. Moreover, the proposed system can include of an energy meter, when a pulse laser is used, which is contained within or affixed to the sample chamber to measure, display and record pulsed laser energy that enters the sample chamber. Alternatively, the proposed system can include of a power meter, when a continuous wave (CW) laser is used, which is contained within or affixed to the sample chamber to measure, display and record laser power that enters the sample chamber.

Figure 1:
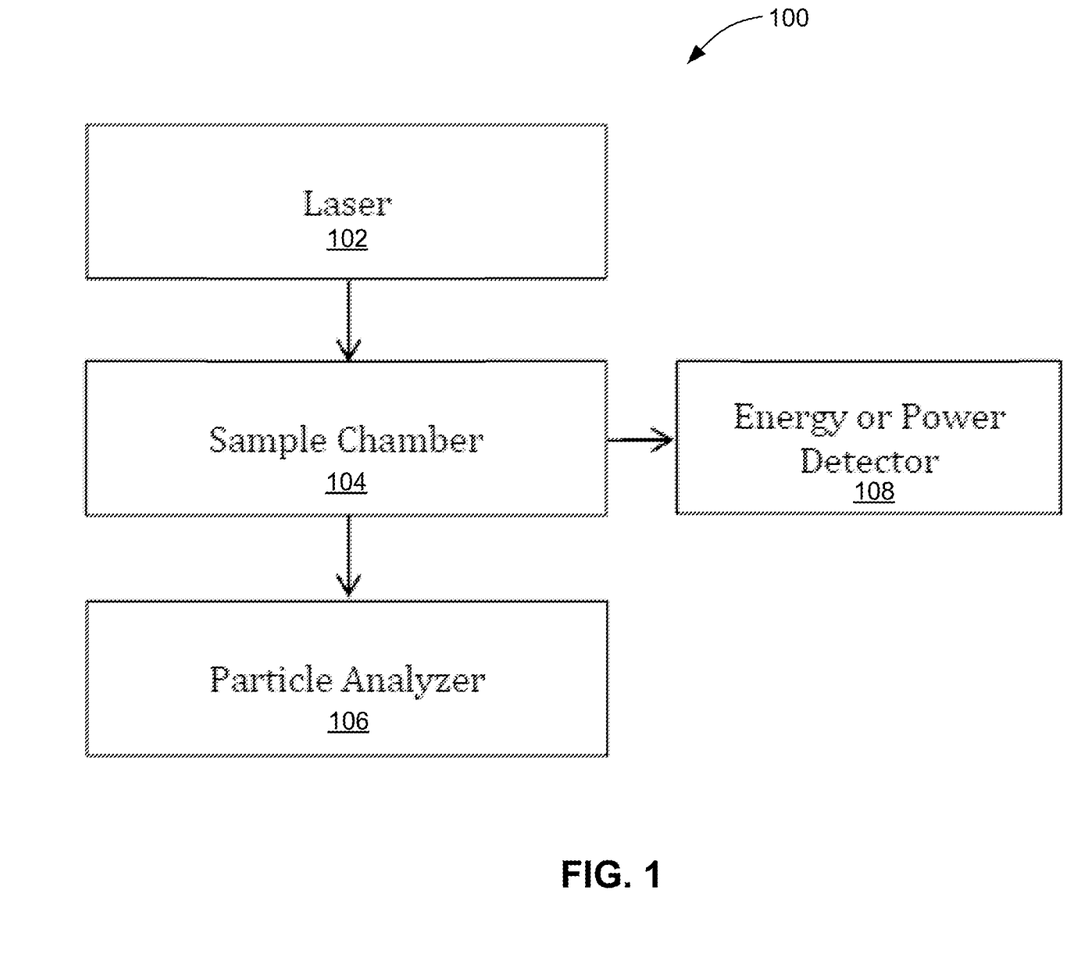
FIG. 1 illustrates a block diagram of a laser ablation system for material analysis in accordance with some embodiments described herein.

FIG. 1 illustrates a block diagram of a laser ablation system 100 for material analysis in accordance with some embodiments described herein. The laser ablation system 100 can include a laser source 102 for emitting an ablation laser beam, beam delivery components for shaping and steering the beam (not shown), a sample chamber 104 for holding one or more samples, a particle analyzer 106 (such as an ICP-MS or ICP-OES) for analyzing the aerosol of particles produced from ablation of the one or more samples. The laser ablation system 100 also includes a laser energy or power detector/meter 108 for measuring, displaying and recording laser power that enters the sample chamber 104. The energy or power detector 108 can be affixed to the sample chamber 104 or placed inside the sample chamber 104. The laser energy/power detector/meter 108 can include, but is not limited to, a photodiode detector, a metal-semiconductor-metal (MSM) photodetector, a thermal detector, a pyroelectric detector, and a photomultiplier tube.

In some implementations, the laser beam leaves the laser source 102 and propagates along a path defined by one or more beam delivery (optical) components such as mirrors and/or lenses that shape and steer the beam in the direction of the sample chamber 104. The laser beam enters the sample chamber 104 through an optical port such as a window or lens. The laser beam is typically focused as it passes through the window or lens and strikes the sample(s) surface with sufficient energy or power density to ablate the sample, generating an aerosol of particles. The particles are swept from the sample chamber 104 to the particle analyzer 106 by flowing gas through the chamber 104 and through a fluid conduit or tubing connecting the sample chamber 104 with the particle analyzer 106. The particle analyzer 106 then identifies the elements and measures the concentrations of the elements that comprise the particles. As used in the context of the present disclosure, the term fluid comprises any liquid, gas, or powder, and/or any combinations thereof, that can be conveyed between the sample chamber 104 and the particle analyzer 106 via the fluid conduit or tubing that fluidically couple the sample chamber 104 and the particle analyzer 106.

We now describe some detailed embodiments of the proposed laser ablation system.

Figure 2:
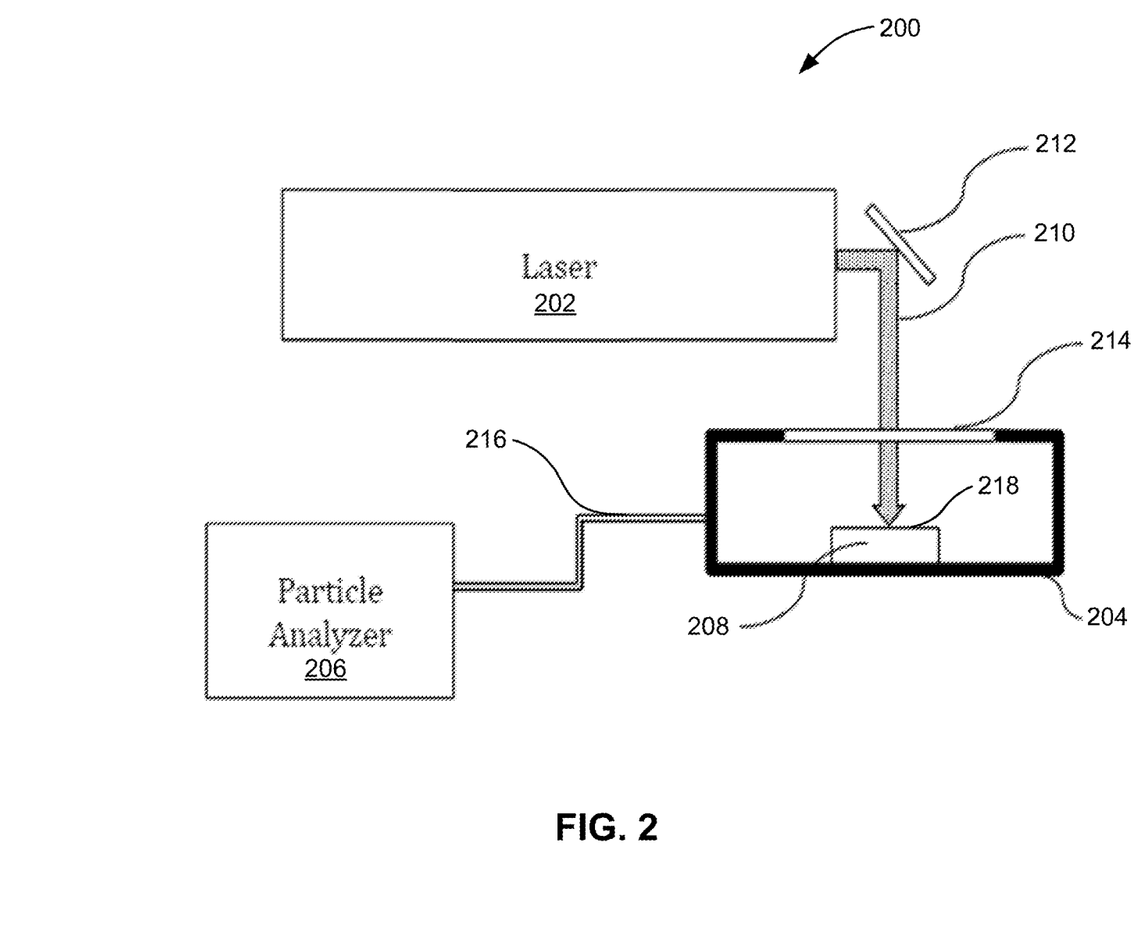
FIG. 2 illustrates a schematic of an exemplary laser ablation system with a laser energy detector, or laser power detector, located inside the sample chamber in accordance with some embodiments described herein.

FIG. 2 illustrates a schematic of an exemplary laser ablation system 200, described generally in FIG. 1, with a laser energy detector 208, or laser power detector, located inside the sample chamber 204 in accordance with some embodiments described herein.

The laser ablation system 200 illustrated in FIG. 2 includes a laser source 202 that emits a beam 210 of pulsed energy or continuous output power, and beam delivery components shown as a mirror 212. However, the beam delivery components that shape and steer the beam 210 can include other optical components such as lenses, and are not limited to mirrors 212. The illustrated laser ablation system 200 also includes a sample chamber 204 that contains one or more samples (not shown). The sample chamber 204 also comprises a window 214 (or lens in some other implementations) that allows passage of the laser beam 210 to the sample(s) located inside the sample chamber 204. The illustrated laser ablation system also includes a laser energy or laser power detector 208 (or the "laser detector" 208) which, in the embodiment illustrated in FIG. 2, is placed inside the sample chamber 204 in the path of the incident laser beam 210. The laser detector 208 can either be secured or unsecured to the interior of the sample chamber 204. The illustrated laser ablation system 200 additionally includes a particle analyzer 206. The particle analyzer 206 may be an inductively coupled mass spectrometer or inductively coupled optical emission spectrometer (i.e., ICP-MS or ICP-OES), which receives particles of the sample(s) through a fluid conduit 216 or tubing fluidically coupled between the sample chamber 204 and the particle analyzer 206 (e.g., ICP-MS or ICP-OES).

As shown in FIG. 2, the laser beam 210 is steered and positioned onto the energy or power detector 208 that is located inside the sample chamber 204. When exposed to the laser beam 210, the detector 208 measures, displays and records the amount of energy or power which is used or to be used to ablate the sample material. Note that it is desirable to position the surface 218 of the detector 208 either above or below the focus of the laser beam 210 where the concentration of energy or power is not high enough to damage the detector 208.

In some implementations, the laser detector 208 is configured to measure the laser power/energy simultaneously when the laser ablation of the sample material is taking place. In some other implementations, the laser detector 208 is configured to measure the laser power/energy before the laser ablation of the sample material takes place. In further implementations, the laser detector 208 is configured to measure the laser power/energy after the laser ablation of the sample material has taken place. Note that when the laser power/energy measurement is performed first, the sample(s) may be placed in the path of the laser beam 210 after the laser power/energy measurement. When the laser power/energy measurement is performed after, the sample(s) may be placed in the path of the laser beam 210 before the laser power/energy measurement and later removed from the laser path.

In some embodiments, the measured laser power/energy is used as feedback to the laser ablation system to automatic adjust the laser beam power/energy.

Figure 3:
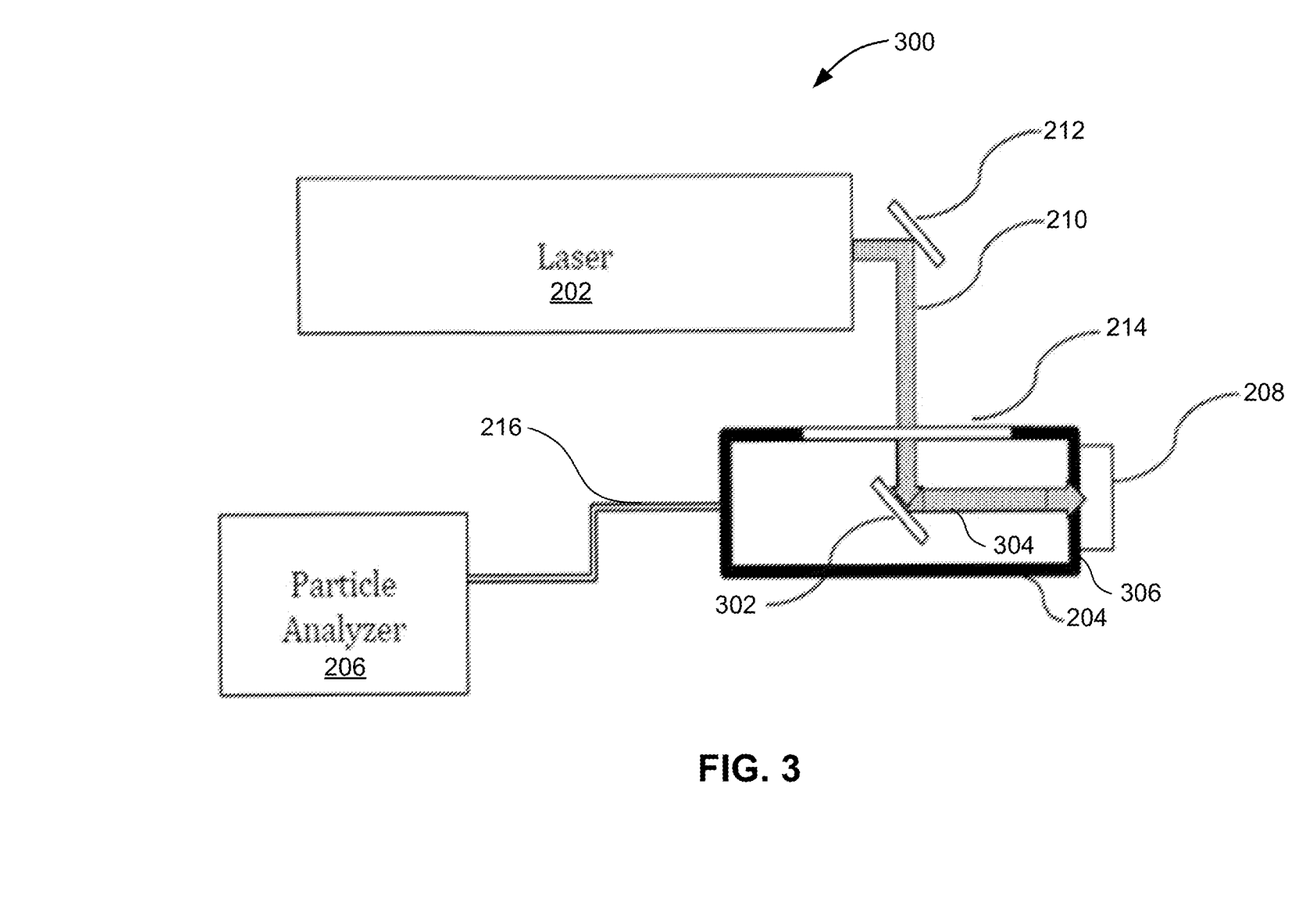
FIG. 3 illustrates a schematic of another exemplary laser ablation system with a laser energy detector, or laser power detector, mounted to the outside wall of the sample chamber in accordance with some embodiments described herein.

FIG. 3 illustrates a schematic of another exemplary laser ablation system 300 with a laser energy detector 208, or laser power detector, mounted to the outside wall of the sample chamber 204 in accordance with some embodiments described herein. The laser ablation system 300 illustrated in FIG. 3 includes substantially the same components as the laser ablation system 200 illustrated in FIG. 2, such as a laser source 202, beam delivery components 212, a sample chamber 204, a laser detector 208, and a particle analyzer 206 (e.g., an ICP-MS or an ICP-OES) fluidically coupled to the sample chamber 204 by a fluid conduit 216. However, instead of placing the laser detector 208 inside in the sample chamber 204, the laser detector 208 in the implementation of FIG. 3 is mounted to the outside wall 306 of the sample chamber 204. More specifically, the laser detector 208 shown in FIG. 3 is mounted on the right outside wall 306 of the sample chamber 204 and the receiver of the laser detector 208 is arranged to overlap an opening defined in the wall 306 of the sample chamber 204. A mirror 320 (i.e., the mirror 302 inside in the sample chamber) is used to redirect the laser beam 210 that enters the sample chamber 204 through the window 214 to the opening in the wall 306 of the sample chamber 204 which allows passage of the laser beam 304 to the externally mounted detector 208. Note that in this exemplary configuration, there is no gap between the outside wall 306 of the sample chamber 204 and the surface of the laser detector 208.

Figure 4:
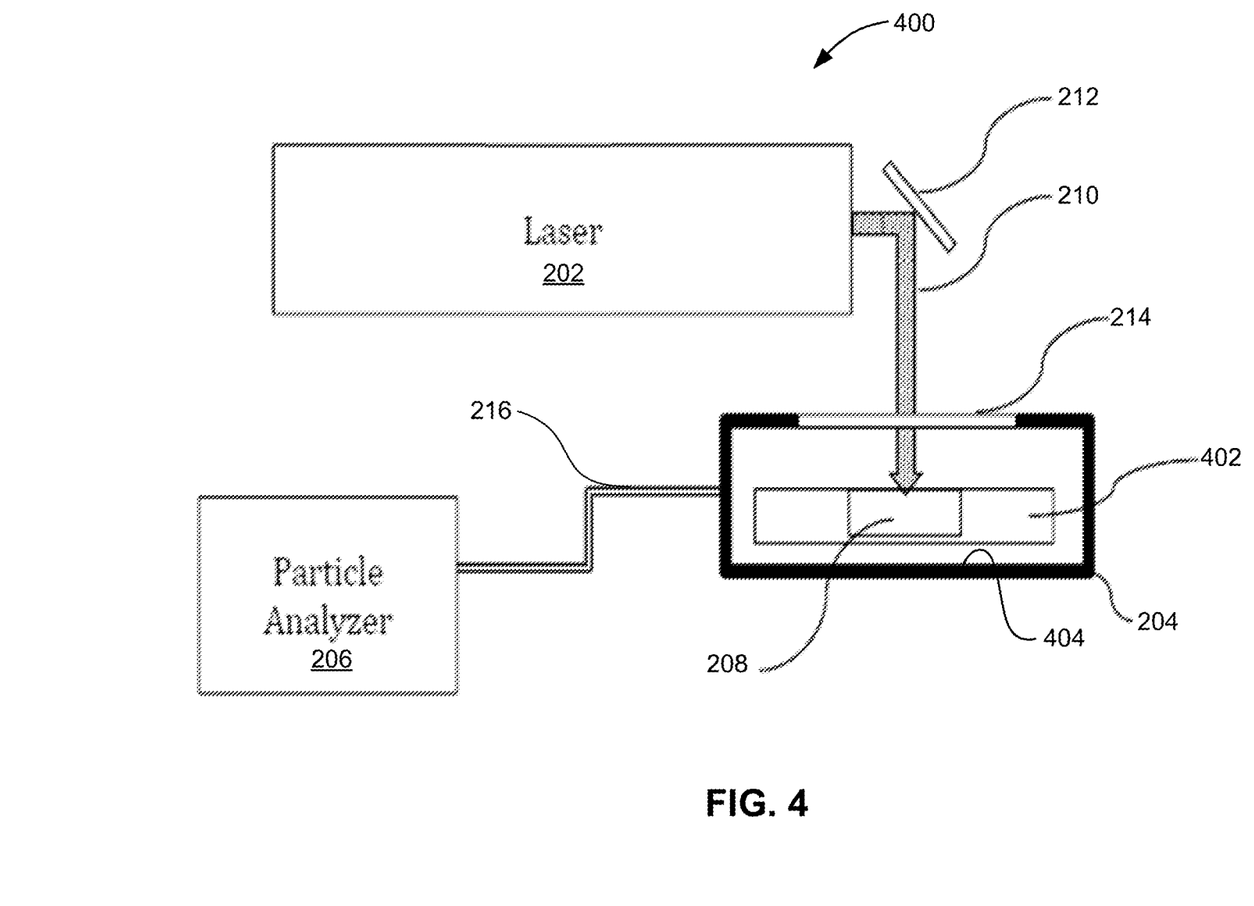
FIG. 4 illustrates a schematic of yet another exemplary laser ablation system with a laser energy detector, or laser power detector, embedded in a removable drawer that is inserted into the sample chamber in accordance with some embodiments described herein.

FIG. 4 illustrates a schematic of yet another exemplary laser ablation system 400 with a laser energy detector 208, or laser power detector, embedded in a removable drawer 402 that is inserted into the sample chamber 204 in accordance with some embodiments described herein. The laser ablation system 400 illustrated in FIG. 4 includes substantially the same components as the illustrated laser ablation system 200 shown in FIG. 2, such as a laser source 202, beam delivery components 212, a sample chamber 204, a laser detector 208, and a particle analyzer 206 (e.g., an ICP-MS or an ICP-OES) fluidically coupled to the sample chamber 204 via a fluid conduit 216. However, instead of placing the laser detector 208 directly onto a bottom portion 404 of the sample chamber 204, the laser detector 208 in the implementation illustrated in FIG. 4 is placed inside a removable drawer 402 unit which is then inserted into the sample chamber 204. Note that the removable drawer 402 may be removed from the sample chamber 204 to remove the laser detector 208. In some implementations, the laser detector 208 is tightly embedded in the removable drawer 402 to prohibit relative movement between the laser detector 208 and the removable drawer 404. The removable drawer 402 also may provide a separate area for placing the sample(s). In such configuration, by repositioning the removable drawer 402 within the sample chamber 204, either the laser detector 208 or the sample material is exposed to the laser beam 210 as needed. Note that the configuration of FIG. 4 provides the freedom of placing and removing the laser detector 208 into and from the sample chamber 204 and therefore to and from the laser ablation system 400.

Figure 5:
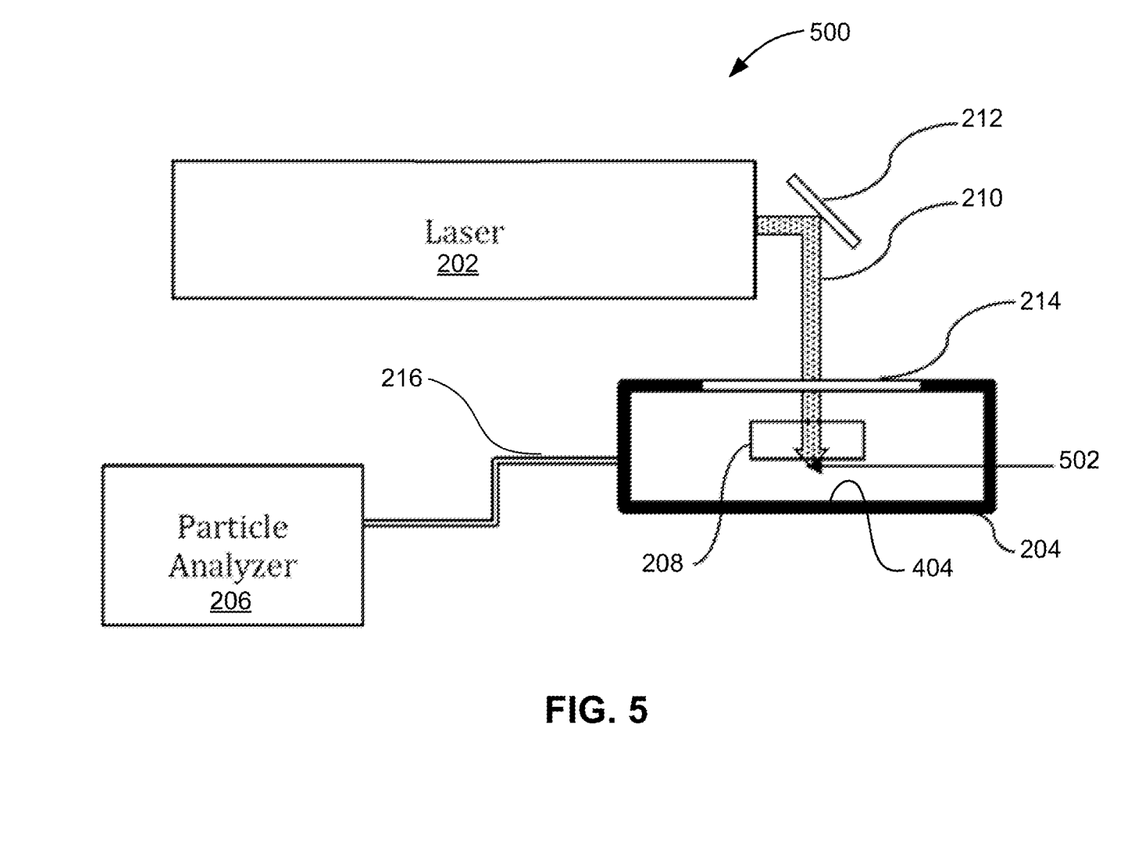
FIG. 5 illustrates a schematic of yet another exemplary laser ablation system with a laser energy detector, or laser power detector, located above a focal plane of the laser beam in accordance with some embodiments described herein.

FIG. 5 illustrates a schematic of yet another exemplary laser ablation system 500 with a laser energy detector 208, or laser power detector, located above a focal plane 502 of the laser beam 210 in accordance with some embodiments described herein. The laser ablation system 500 illustrated in FIG. 5 includes substantially the same components as the illustrated laser ablation system 200 shown in FIG. 2, such as a laser source 202, beam delivery components 212, a sample chamber 204, a laser detector 208, and a particle analyzer 206 (e.g., an ICP-MS or an ICP-OES) fluidically coupled to the sample chamber 204 via a fluid conduit 216. However, instead of placing the laser detector 208 directly onto a bottom portion 404 of the sample chamber 204, the laser detector 208 in the implementation illustrated in FIG. 5 is placed above the focal plane 502 of the laser beam 210 where the power density of the laser beam 210 is reduced to a level that prevents damage the laser detector 208. In some implementations, the laser detector 208 can be mounted inside (or outside) the sample chamber 204 above the focal plane 502 of the laser beam 210 where the power density of the laser beam 210 is reduced to a level that prevents damage the laser detector 208.

Figure 6:
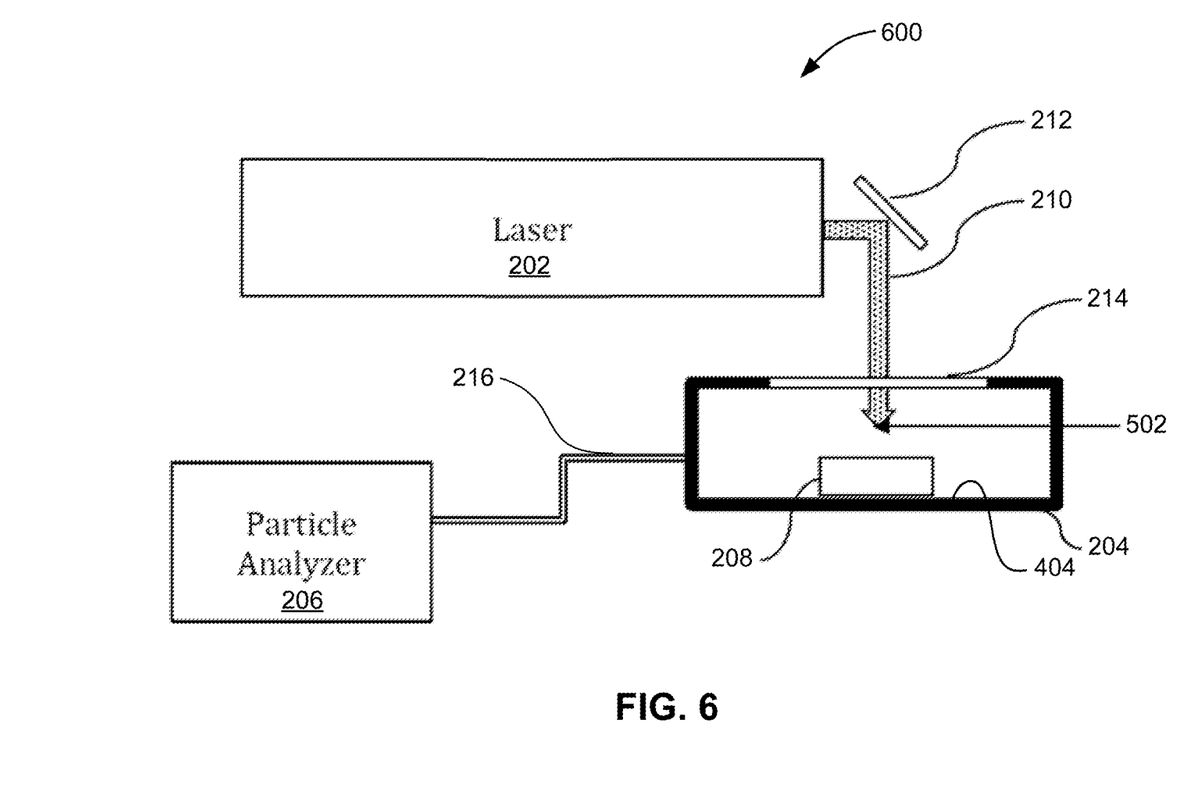
FIG. 6 illustrates a schematic of yet another exemplary laser ablation system with a laser energy detector, or laser power detector, located below a focal plane of the laser beam in accordance with some embodiments described herein.

FIG. 6 illustrates a schematic of yet another exemplary laser ablation system 600 with a laser energy detector 208, or laser power detector, located below the focal plane 502 of the laser beam 210 in accordance with some embodiments described herein. The laser ablation system 600 illustrated in FIG. 6 includes substantially the same components as the illustrated laser ablation system 200 shown in FIG. 2, such as a laser source 202, beam delivery components 212, a sample chamber 204, a laser detector 208, and a particle analyzer 206 (e.g., an ICP-MS or an ICP-OES) fluidically coupled to the sample chamber 204 via a fluid conduit 216. However, the laser detector 208 is placed directly onto a bottom portion 404 of the sample chamber 204 below the focal plane 502 of the laser beam 210 where the power density of the laser beam 210 is reduced to a level that prevents damage the laser detector 208. In some implementations, the laser detector 208 can be mounted inside (or outside) the sample chamber 204 above the bottom portion 404 and below the focal plane 502 of the laser beam 210 where the power density of the laser beam 210 is reduced to a level that prevents damage the laser detector 208.

In various other implementations, the laser detector 208 shown in FIGS. 5 and 6 can be mounted inside (or outside) the sample chamber 204 such that it is located at the focal plane 502 of the laser beam 210 providing that the power density of the laser beam 210 is reduced to a level that prevents damage the laser detector 208.

Figure 7:
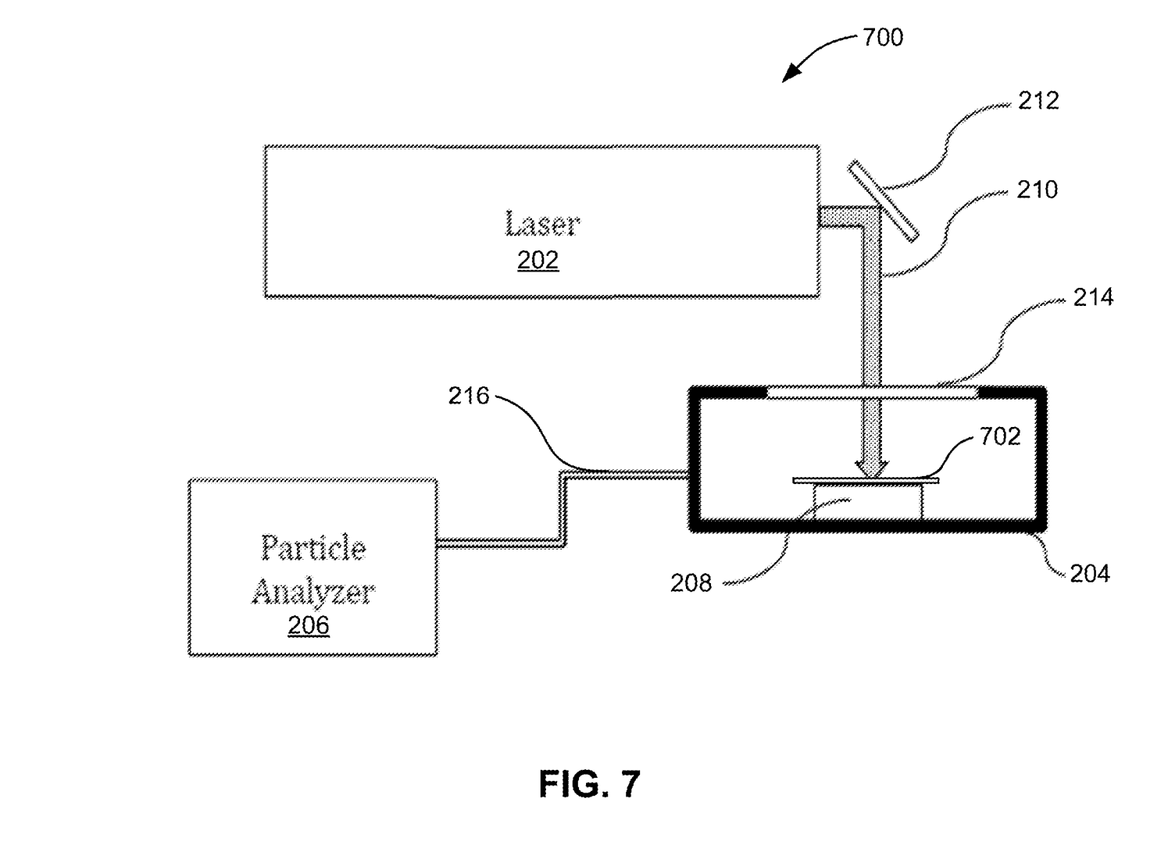
FIG. 7 illustrates a schematic of yet another exemplary laser ablation system with a laser energy detector, or laser power detector, located at the focal plane of the laser beam and below a protective filter in accordance with some embodiments described herein.

FIG. 7 illustrates a schematic of yet another exemplary laser ablation system 700 with a laser energy detector 208, or laser power detector, located at the focal plane of the laser beam 502 and below a protective filter 702 in accordance with some embodiments described herein. Accordingly, in some implementations, the laser detector 208 can be located inside (or outside) the sample chamber 204 at the focal plane 502 of the laser beam 210 when a protective filter 702 or other material is located between the laser energy detector 208 and the laser beam 210 to prevent damage to the laser energy detector 208 by the laser beam 210.

Figure 8:
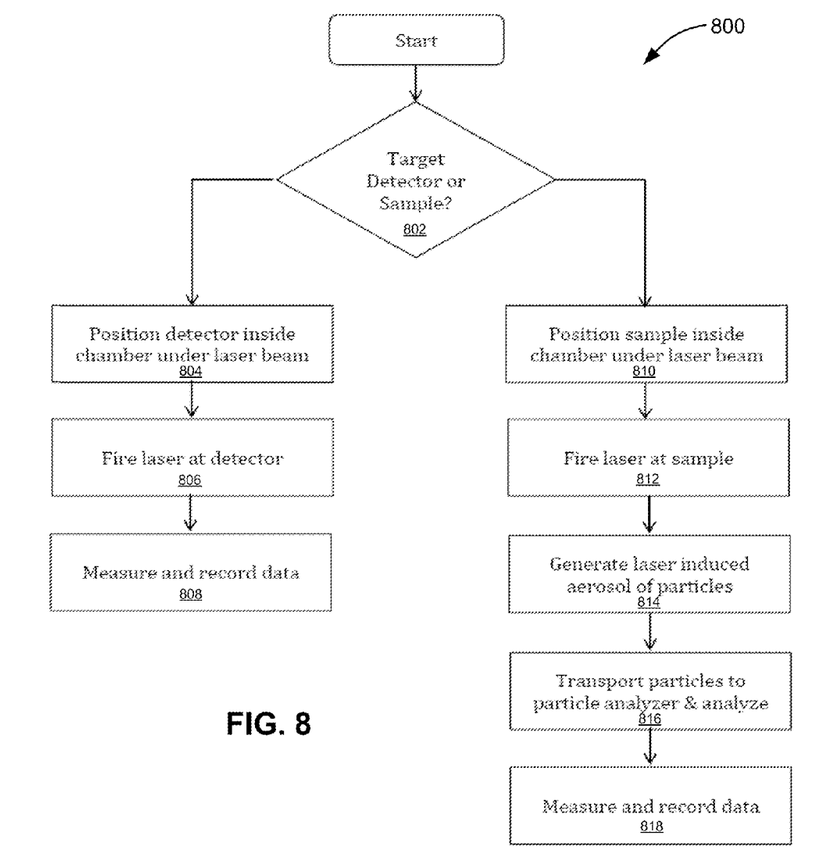
FIG. 8 presents a flowchart illustrating a process of performing material analysis using a laser ablation system including a laser power/energy detector in accordance with some embodiments described herein.

FIG. 8 presents a flow diagram 800 illustrating a process of performing material analysis using a laser ablation system 100, 200, 400 including a laser power/energy detector 208 in accordance with some embodiments described herein. With reference now also to FIGS. 1, 2, and 4, the process 800 may first determine 802 whether the target is a laser detector 208 or the sample. When the process 800 determines 802 that the target is the laser detector 208 (e.g., at the beginning of the material analysis when the laser power needs to be measured), the process 800 then positions 804 the laser detector 208 inside the chamber 204 in the path of the laser beam 210 (if the laser detector 208 is not already placed inside the sample chamber 204). The process 800 then delivers, e.g., fires 806, the laser beam 210 (e.g., at the same power/energy to be used later for sample ablation) at the laser detector 208, and subsequently measures and records 808 the laser power/energy data. At the point, the laser detector 208 may be removed from the sample chamber 204. Note that the measured and recorded laser power/energy data can be used to reproduce the laser ablation processes, and these data also provide a means to monitor degradation or loss of energy that may occur in the laser beam path leading up to the sample chamber 204 and losses through the sample chamber window.

When the process 800 determines 802 that the target is the sample, the process 800 may then position 810 the sample inside the sample chamber 204 in the path of the laser beam 210 (if the sample is not already placed inside the sample chamber 204). The process 800 then fires 812 the laser beam 210 (e.g., at the same power/energy used for the power/energy measurement) at the sample to generate 814 laser induced aerosol of particles. The process 800 subsequently transports 816 the particles from the sample chamber 204 to the particle analyzer 206, e.g., by flowing gas through the sample chamber and through the tubing 216 that fluidically connects the sample chamber 204 with the particle analyzer 206. The particle analyzer 206 then identifies the elements and measures 818 the concentrations of the elements that comprise the particles and subsequently records the analysis data.

It will be appreciated that the process 800 can be adjusted and modified for the implementations illustrated in connection with the laser ablation system 300, 500, and 600 described in FIGS. 3, 5, and 6 where the laser detector 208 is positioned outside the sample chamber 208 as shown in FIG. 3, above the focal plane 502 of the laser beam 210 as shown in FIG. 5, or below the focal plane 502 of the laser beam 210.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document.

The invention claimed is:

1. A laser ablation system for performing material analysis, comprising:
    a sample chamber which holds and encloses a sample material to be ablated;
    a laser source that produces a laser beam which is directed into the sample chamber to a surface of the sample material to cause laser ablation;
    a laser measuring device which is physically attached to the sample chamber to measure a power/energy value of the laser beam, wherein the laser measuring device is configured to provide feedback to the laser ablation system to allow for automatic adjustment of the power/energy value of the laser beam; and
    a material analyzing module that is coupled to the sample chamber to receive the ablated material from laser ablation of the sample material, wherein the material analyzing module is configured to analyze the ablated material by performing spectrometry on the ablated material.

2. The laser ablation system of claim 1, wherein the laser measuring device is a laser energy detector or energy meter.

3. The laser ablation system of claim 1, wherein the laser measuring device is a laser power detector or power meter.

4. The laser ablation system of claim 1, wherein the laser measuring device is a photodiode detector.

5. The laser ablation system of claim 1, wherein the laser measuring device is a metal-semiconductor-metal (MSM) photodetector.

6. The laser ablation system of claim 1, wherein the laser measuring device is a thermal detector.

7. The laser ablation system of claim 1, wherein the laser measuring device is a pyroelectric detector.

8. The laser ablation system of claim 1, wherein the laser measuring device is a photomultiplier tube.

9. The laser ablation system of claim 1, wherein the laser measuring device is located inside the sample chamber and the laser beam entering the sample chamber is directed onto a receiver of the laser measuring device by mirrors or other means.

10. The laser ablation system of claim 1, wherein the laser measuring device is mounted to an outside wall of the sample chamber and the laser beam entering the sample chamber is directed onto a receiver of the laser measuring device through an opening in a wall of the sample chamber.

11. The laser ablation system of claim 1, wherein the laser measuring device is mounted onto or placed inside a removable drawer which is inserted into the sample chamber.

12. The laser ablation system of claim 11, wherein the removable drawer includes an area separated from the laser measuring device for holding the sample material.

13. The laser ablation system of claim 1, wherein the laser measuring device is located above the focal plane of the laser beam.

14. The laser ablation system of claim 1, wherein the laser measuring device is located below the focal plane of the laser beam.

15. The laser ablation system of claim 1, wherein the laser measuring device is located at the focal plane of the laser beam and below a protective filter.

16. The laser ablation system of claim 1, wherein the laser power/energy is measured simultaneously when the laser ablation of the sample material is taking place.

17. The laser ablation system of claim 1, wherein the laser power/energy is measured before the laser ablation of the sample material takes place.

18. The laser ablation system of claim 1, wherein the laser power/energy is measured after the laser ablation of the sample material has taken place.

19. The laser ablation system of claim 1, wherein the laser source includes a pulsed laser source.

20. The laser ablation system of claim 1, wherein the laser source includes a continuous wave (CW) laser source.

21. The laser ablation system of claim 1, wherein the material analyzing module includes an inductively coupled mass spectrometer (ICP-MS) or an inductively coupled optical emission spectrometer (ICP-OES) instrument.

22. A method for performing material analysis using a laser ablation system, comprising:
   directing a laser beam onto a surface of a sample material placed inside a sample chamber to cause laser ablation of the sample material;
   during the laser ablation, simultaneously measuring a laser power/energy of the laser beam using a laser measuring device which is physically attached to the sample chamber, wherein the laser measuring device is configured to provide feedback to the laser ablation system to allow for automatic adjustment of the laser power/energy of the laser beam; and
   using a material analyzing module coupled to the sample chamber to receive the ablated material from laser ablation of the sample material for material analysis, wherein the material analyzing module is configured to analyze the ablated material by performing spectrometry on the ablated material.

23. A method for performing material analysis using a laser ablation system, comprising:
   directing a laser beam onto a surface of a sample material placed inside a sample chamber to cause laser ablation of the sample material;
   using a material analyzing module coupled to the sample chamber to receive the ablated material from laser ablation of the sample material for material analysis, wherein the material analyzing module is configured to analyze the ablated material by performing spectrometry on the ablated material;
   after the laser ablation, directing the laser beam onto a laser measuring device physically attached to the sample chamber to measure a laser power/energy of the laser beam, wherein the laser measuring device is configured to provide feedback to the laser ablation system to allow for automatic adjustment of the laser power/energy of the laser beam.

24. A method for performing material analysis using a laser ablation system, comprising:
   directing a laser beam onto a laser measuring device which is physically attached to a sample chamber to measure a laser power/energy of the laser beam, wherein the laser measuring device is configured to provide feedback to the laser ablation system to allow for automatic adjustment of the laser power/energy of the laser beam;
   after the laser power/energy measurement, directing the laser beam onto a surface of a sample material placed inside the sample chamber to cause laser ablation of the sample material; and
   using a material analyzing module coupled to the sample chamber to receive the ablated material from laser ablation of the sample material for material analysis, wherein the material analyzing module is configured to analyze the ablated material by performing spectrometry on the ablated material.

* * * * *